Nov. 20, 1951         C. E. NEWMAN         2,576,035
MACHINE FOR CHECKING OILING SYSTEMS OF AUTOMOBILE
TRUCK AND TRACTOR ENGINES
Filed Nov. 12, 1947

INVENTOR.
Charles E. Newman.
BY *Victor J. Evans & Co.*

ATTORNEYS

Patented Nov. 20, 1951

2,576,035

UNITED STATES PATENT OFFICE 2,576,035

MACHINE FOR CHECKING OILING SYSTEMS OF AUTOMOBILE TRUCK AND TRACTOR ENGINES

Charles E. Newman, Oskaloosa, Iowa

Application November 12, 1947, Serial No. 785,260

5 Claims. (Cl. 73—37)

My present invention relates to an improved device for testing the efficiency of engine oiling systems and especially to an apparatus designed to be connected to the oil system of an internal combustion engine after removal of the crank case pan and to supply oil under pressure to the system so that leaks or stoppages may readily be located.

The device of my invention generally consists in a pan or trough to be located under the engine from which the crank case pan has been removed, and a powered pump forcing oil in the trough, under pressure to and through the oil passages of the engine to the various bearings. If the bearings are worn, the oil will spray or flow freely and the oil will fall into the trough observed by the tester, and of course stoppage will be apparent to an experienced mechanic who will see the failure of oil to flow where it should.

In the accompanying drawings I have illustrated one complete example of the physical embodiment of my invention according to the best mode I have thus far devised, but it will be understood that various changes and alterations may be made in the exemplified structure within the scope of the appended claims.

Figure 1:
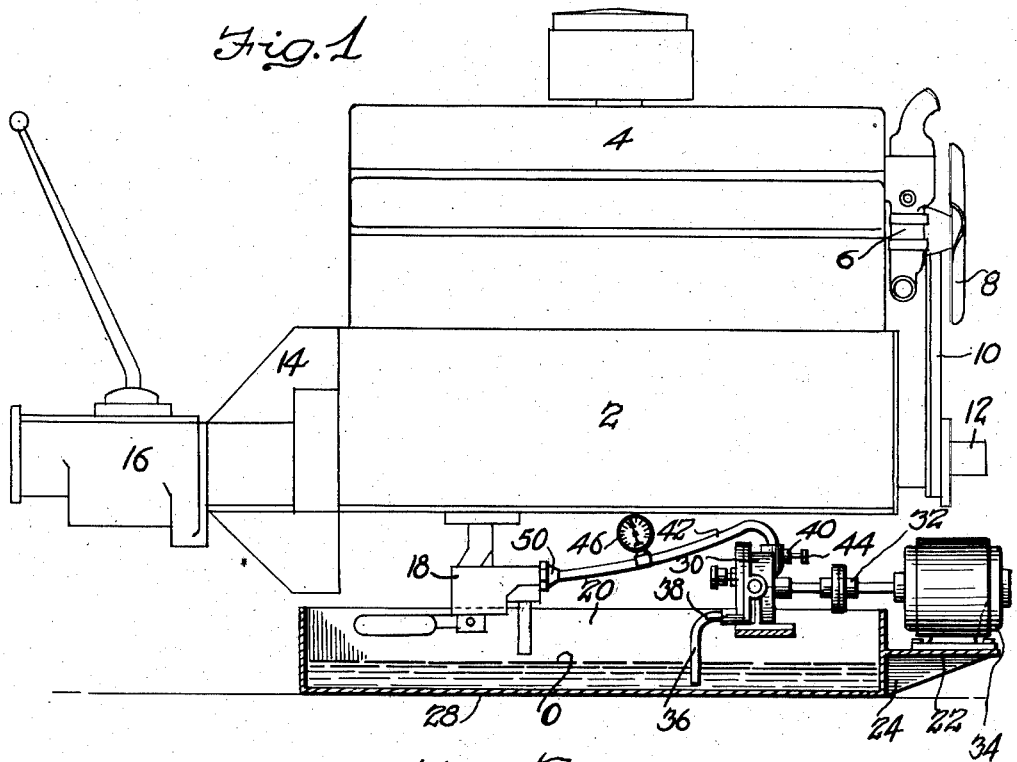
Fig. 1 is a side elevational view of the device of my invention installed and ready for use with an auto or truck engine.
Figure 2:
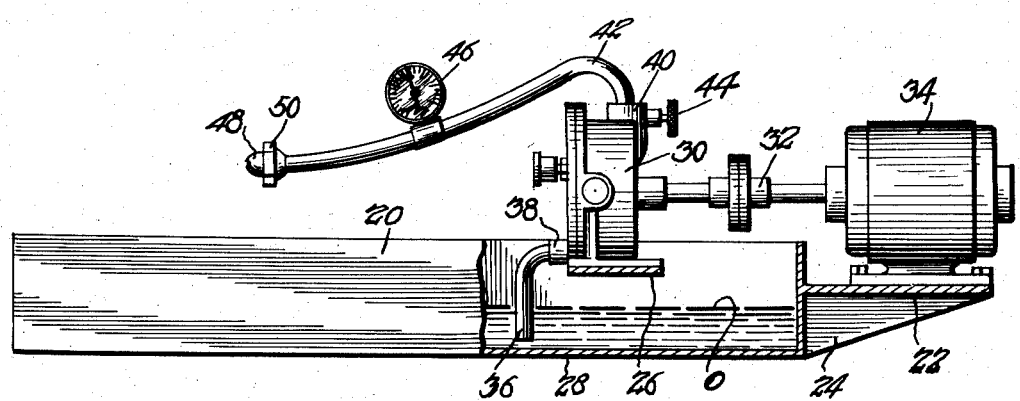
Fig. 2 is an enlarged detail view of the device.

Referring now to the drawings wherein I have illustrated the present preferred embodiment of my invention, I have shown a conventional internal combustion engine including the block 2 and head 4, with a water pump 6 and fan 8 driven by belt 10 from cam shaft 12. The usual flywheel cover 14 and transmission 16 perform their usual functions and the oil pump 18 has a conventional threaded bore to receive the return oil pipe, not shown.

As shown here the crank case or oil pan has been removed so that the main and rod bearings will be visible to the mechanic.

My device consists in the pan or trough 20 having a platform 22 outside one end wall supported by braces 24. On a strap 26 spaced above the bottom 28 of the trough 20, I support a suitable pump 30 driven by shaft 32 from motor 34 on platform 22 and this pump has an intake tube 36 for nipple 38, and the outlet nipple 40 receives a pipe 42 provided with pressure relief valve 44.

A pressure gauge 46 may be used in this pipe, and the nipple 48 is adapted for insertion in the threaded bore for the return oil pipe of pump 18 and secured by threaded cap 50. Oil O is poured into the pan or trough 20 and with the device connected, the pump 30 will draw oil from pan 20 and force it into the idle pump 18 and thence through the engine oiling system. Loose or worn bearings will permit the too free flow of oil and it will cascade back into the pan 20. Oil stoppages will be conspicuous by the absence of flow at places where oil should flow By the use of this device, a mechanic may quickly and easily locate the cause of engine lubrication troubles and many hours of time may be saved in guessing as to the seat of the trouble.

Having thus fully described my invention what I claim as new and desire to secure by Letters Patent is:

1. A device as described for checking the oiling system of an internal combustion engine having a pump for said system; comprising a pan located below and spaced from the engine and said pan adapted to contain a quantity of oil, a strap extending across the pan internally thereof, a pump mounted on the strap and having an intake tube in the oil, and an outlet tube for the pump connected with the pump for the oil system of the engine.

2. A device as described for checking the oiling system of an internal combustion engine having a pump for said system; comprising a pan located below and spaced from the engine and said pan adapted to contain a quantity of oil, a strap extending across the pan internally thereof, a pump mounted on the strap and having an intake tube in the oil, and an outlet tube for the pump having a nipple connected with the pump for the oil system of the engine.

3. A device as described for checking the oiling system of an internal combustion engine having a pump for said system; comprising a pan located below and spaced from the engine and said pan adapted to contain a quantity of oil, a strap extending across the pan internally thereof, a pump mounted on the strap and having an intake tube in the oil, and an outlet tube for the pump connected with the pump for the oil system of the engine and a pressure gauge in the outlet tube.

4. A device as described for checking the oiling system of an internal combustion engine having a pump for said system; comprising a pan located below and spaced from the engine and said pan adapted to contain a quantity of oil, a strap extending across the pan internally thereof, a pump mounted on the strap and having an intake tube in the oil, and an outlet tube for the pump connected with the pump for the oil system of the engine and a pressure gauge in the outlet tube, and means for controlling the pressure of oil in the outlet tube.

5. A device as described for checking the oiling system of an internal combustion engine having a pump for said system; comprising a pan located below and spaced from the engine and said pan adapted to contain a quantity of oil, a strap extending across the pan internally thereof, a pump mounted on the strap and having an intake tube in the oil, and an outlet tube for the pump connected with the pump for the oil system of the engine and a pressure gauge in the outlet tube, and a relief valve for controlling the pressure of oil in the outlet tube.

CHARLES E. NEWMAN.

REFERENCES CITED

The following references are of record in the file of this patent:

UNITED STATES PATENTS

| Number | Name | Date |
| --- | --- | --- |
| 1,861,684 | Dague | June 7, 1932 |
| 1,982,408 | Wotachek | Nov. 27, 1934 |
| 2,018,403 | Hussar | Oct. 22, 1935 |
| 2,098,677 | Sabballus et al. | Nov. 9, 1937 |
| 2,354,562 | Webb | July 25, 1944 |